United States Patent Office 3,444,214
Patented May 13, 1969

3,444,214
1-AMINO-4-ANILINO-2-NITRO-ANTHRA-
QUINONES AND DERIVATIVES
Paul Buecheler, Reinach, Basel-Land, Switzerland, assignor to Sandoz Ltd. (also known as Sandoz A.G.), Basel, Switzerland
No Drawing. Filed Jan. 18, 1965, Ser. No. 426,393
Claims priority, application Switzerland, Jan. 20, 1964, 599/64; Mar. 4, 1964, 2,760/64; Mar. 20, 1964, 3,597/64
Int. Cl. C07c 97/12; C09b 1/16
U.S. Cl. 260—378          9 Claims

ABSTRACT OF THE DISCLOSURE

Dyes of the 1,4-diamino-anthraquinone series substituted with at least one nitro group in the nucleus are particularly suitable for dyeing, padding or printing textile materials of fully synthetic or semi-synthetic high molecular substances.

---

This invention relates to new dyes of the anthraquinone series which have the formula

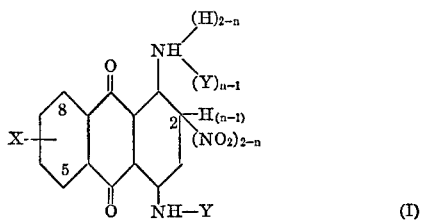

(I)

wherein:
X is a member selected from the group consisting of hydrogen and the nitro group, and stands in one of the positions 5 and 8,
Y is a member selected from the group consisting of unsubtituted phenyl, phenyl substituted by 1 to 3 lower alkyl groups, phenyl substituted by 1 to 2 lower alkoxy groups, phenyl substituted by 1 halogen atom with an atomic number of at most 17, and phenyl substituted by one lower alkanoylamino group, and
$n$ is one of the integers 1 and 2,
the dye molecule containing at least one nitro group.

The ring A can bear as substituents one or two low-molecular alkyl groups, preferably in the 6- and 7-positions, one to four halogen atoms (fluorine, bromine or preferably chlorine atoms), or an alkoxy or aryloxy radical.

Especially interesting dyes of the Formula I are those which correspond to the formulae

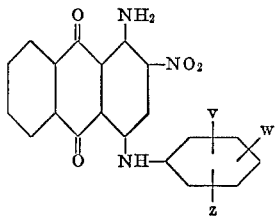

(II)

and

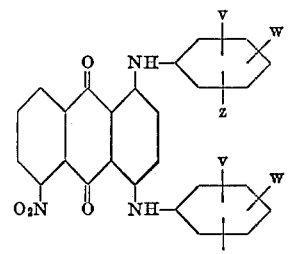

(III)

wherein:
$v$ represents hydrogen, chlorine, fluorine, lower alkyl, lower alkoxy or lower alkanoylamino,
$w$ represents hydrogen, lower alkyl or lower alkoxy, and
$z$ represents hydrogen or lower alkyl,
$w$ and $z$ being hydrogen, when $v$ represents chlorine, fluorine or lower alkanoylamino.

The process for the production of the new dyes consists in condensing 1 mole of an anthraquinone compound of the formula

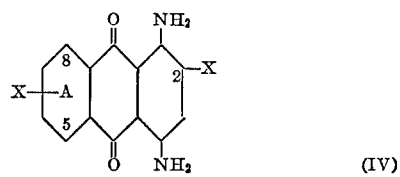

(IV)

with 1 or 2 moles of a substituted or unsubstituted halogenated hydrocarbon. When X in the 2-position of the compounds of Formula IV is a nitro group, the adjacent amino group in the 1-position is so very difficult to condense that the reaction yields practically a monocondensation product.

The substituted or unsubstituted halogenated hydrocarbon is an aryl halide, in particular bromobenzene or a bromobenzene substituted by one or more identical or different low-molecular alkyl or alkoxy groups, e.g., 1-bromo-4-methylbenzene, 1-bromo-4-ethylbenzene, 1-bromo-2,4-dimethylbenzene, 1-bromo-2,4,6-trimethylbenzene, 2 - bromo - 1-ethyl-3,5-dimethylbenzene, 1-bromo-4-methoxybenzene, 1-bromo-4 - ethoxybenzene or 1 - acetylamino-4-bromobenzene.

The condensation reaction is carried out to advantage in the presence of an excess of the halogenated hydrocarbon or an organic solvent which is indifferent under the reaction conditions. It is accelerated by the addition of copper or a copper compound, e.g. copper (I) chloride, copper acetate or copper sulfate. The addition of acid-binding agents, e.g. sodium or potassium acetate or sodium or potassium carbonate, is beneficial. The reaction temperature can range from about 120° C. to 220° C., but it is preferably between 140° and 180° C. The compounds of Formula I can be isolated by eliminating the reaction medium or by precipitation with organic solvents, e.g. alcohols.

For the production of the anthraquinone compounds of Formula IV, which contain two nitro groups, anthraquinone compounds of formula

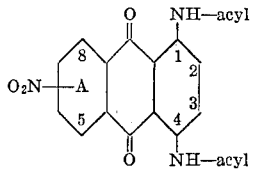

wherein acyl stands for, e.g., acetyl or benzoyl and the nitro group in the nucleus A occupies the 5- or 8-position, can be nitrated in the 2- or 3-position with subsequent cleavage of the acyl radicals still present.

The compounds of Formula V are produced by acylation, e.g. with acetic anhydride or benzoyl chloride, of the corresponding compounds of formula

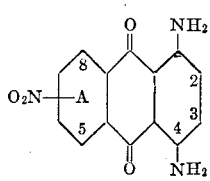

The compounds of Formula V are nitrated with nitric acid of 50–95% or preferably about 70% strength and in the presence of an inert organic solvent and/or a diluent. Inert organic solvents and/or diluents are those which do not react with either of the reactants under the conditions, e.g. nitrated aromatic compounds, such as nitrobenzene.

The reaction temperature chosen is generally between about 50° and 100° C.; the optimum temperature range is about 80° to 95° C.

The acyl groups which may be still present in the reaction product are split off with the aid of concentrated acids, preferably 90–100% sulfuric acid, at a high temperature, preferably 70–100° C. On completion of hydrolysis the reaction mass is run into cold water, the product filtered off, washed with warm sodium carbonate solution if desired and then with water, and finally dried.

Before application the new dyes are best converted into dye preparations by grinding until the average particle size is about 0.01 to 10 microns with the bulk of the particles 0.1 to 5 microns in size. Grinding can be carried out in the presence of dispersing agents and/or fillers. The dry dye can be ground with a dispersing agent and fillers if necessary, or alternatively kneaded in paste form with a dispersing agent and then dried in a vacuum or jet drier. After the addition of a suitable volume of water, the preparations can be used for dyeing from long or short baths and for padding or printing. For dyeing from long baths amounts of dyestuff of up to 20 grams per liter are generally used and for dyeing from short baths up to about 80 grams per liter. Padding liquors may contain up to about 150 grams dye per liter and printing pastes up to about 150 grams per kilogram of the paste. The liquor ratio can vary within wide limits, e.g. between approximately 1:3 and 1:200 or preferably between 1:3 and 1:80.

The new dyes build up excellently on materials of fully synthetic or semi-synthetic high-molecular substances. They are particularly suitable for dyeing, padding or printing filaments, fibers, fleeces, woven fabrics and knitted goods of cellulose triacetate and linear aromatic polyesters. These are mostly polycondensation products of terephthalic acid and glycols, notably ethylene glycol, and are sold under the registered trade names "Terylene," "Diolen" and "Dacron." Related products, e.g. "Kodel," a condensation product of terephthalic acid and 1,4-bis-(hydroxymethyl-cyclohexane, can also be dyed in this way.

The known dyeing methods are used. Polyester fibers can be exhaustion dyed in the presence of carriers at temperatures between about 80° and 125° C. or in the absence of carriers under pressure at about 100° to 140° C. They can also be padded with aqueous dispersions of the new dyes or printed and the paddings or prints fixed at about 140° to 230° C., e.g. with the aid of water vapor, contact heat or hot air. Generally the normal dispersing agents are added, preferably those of anionic or nonionic character; mixtures of these dispersing agents can be used. Approximately 0.5 gram of dispersing agent per liter of the dyeing medium is often sufficient, but larger amounts, e.g. up to about 3 grams per liter, can be used. Amounts in excess of 3 grams do not generally offer any further advantage. Examples of known anionic dispersing agents which can be used for the process are the condensation products of naphthalenesulfonic acids and formaldehyde, notably dinaphthylmethane-disulfonate, the esters of sulfonated succinic acid, Turkey red oil, the alkali metal salts of the sulfuric acid esters of fatty alcohols, e.g. sodium lauryl sulfate or sodium cetyl sulfate, sulfite cellulose waste liquor or its alkali metal salts, soaps, and the alkali metal sulfates of the monoglycerides of fatty acids. Examples of known and particularly suitable nonionic dispersing agents are the addition products of approximately 3–40 moles of ethylene oxide to alkyl-phenols, fatty alcohols or fatty amines, and their neutral sulfuric acid esters.

Green to greenish blue dyeings are obtained which have excellent fastness to light, thermofixation, sublimation, pleating, cross dyeing, gas fumes, chlorine and dry cleaning, and excellent wet fastness properties, e.g. to water, washing and perspiration.

The new dyes are also valuable pigments for the mass coloration of plastics, rubber, matural and synthetic resins, and of solutions of these materials, and they can be used for printing films, foils and textiles of natural fibers, leather or paper.

In the following examples the parts and percentages are by weight and the temperatures are in degrees centigrade.

EXAMPLE 1

14 parts of 1,4-diamino-2-nitroanthraquinone, 150 parts of bromobenzene, 20 parts of potassium acetate, 0.1 part of copper (I) chloride and 0.1 part of copper bronze are stirred for 6 hours at 160°. The acetic acid formed is eliminated by conducting a weak jet of air over the reaction mass. Subsequently the mass is stirred into 400 parts of iso-propyl alcohol and the precipitate formed is filtered off with suction, washed with iso-propyl alcohol and with water, and dried. The 1-amino-2-nitro-4-phenyl-aminoanthraquinone obtained is a dark green powder and melts at 212–214°. It dissolves in chlorobenzene to give green solutions.

Dyeing method 0.6 part of the above dye, 0.6 part of the sodium salt of dinaphthylmethane-disulfonic acid and 11 parts of water are ground until a fine dispersion is formed. This is run into a dyeing autoclave where it is mixed with 3000 parts of water and 3 parts of a highly sulfonated castor oil. 100 parts of a fabric of linear aromatic polyester fiber are entered into the bath. The autoclave is closed and immersed in an oil bath at 60°, which is then raised to 130° in the course of 45 minutes. Dyeing is continued for 30 minutes at this temperature, then the bath is cooled, the fabric removed, rinsed and treated for 20 minutes at 70° in a bath of 3000 parts of water and 1 part of an alkylphenyl-polyglycol ether, rinsed again with water and dried. The polyester fabric is dyed in a bright green shade; the dyeing has excellent fastness to light, washing, perspiration, pleating and thermofixation.

EXAMPLE 2

A mixture of 14 parts of 1,4-diamino-2-nitroanthraquinone, 75 parts of nitrobenzene, 50 parts of 1-bromo-4-methylbenzene, 20 parts of potassium acetate, 5 parts of sodium carbonate, 0.1 part of copper bronze and 0.1 part of copper (I) chloride is stirred for 24 hours at 170°, after which 300 parts of methyl alcohol are added at 60°. The precipitate formed is filtered off with suction at room temperature, washed with methyl alcohol and water and dried. 1-amino-2-nitro-4-(4'-methylphenylamino)-anthraquinone is obtained which dissolves in chlorobenzene with a green coloration.

EXAMPLE 3

A mixture of 14 parts of 1,4-diamino-5-nitroanthraquinone, 150 parts of bromobenzene, 40 parts of potassium acetate, 0.2 part of copper (I) chloride and 0.2 part of copper powder is stirred for 14 hours at 155–160°. A jet of dry air is conducted over the reaction mass. Further bromobenzene is added in portions totalling 120 parts to replace that lost by evaporation. The reaction mass is allowed to cool to 100° and run into 400 parts of methyl alcohol, upon which the precipitate formed is filtered off with suction, washed with methyl alcohol and then with hot water, and dried.

The 1,4 - di - (phenylamino)-5-nitroanthraquinone obtained dissolves in chlorobenzene with a green coloration and dyes polyester fibers by the dyeing method described in Example 1 in bright green shades which have excellent fastness to light, washing, perspiration, pleating, thermofixation and sublimation.

Dyeing can be carried out in an open bath at 100° with the addition of a carrier, e.g. 1-hydroxy-2-phenyl-benzene, instead of in an autoclave at 130°.

EXAMPLE 4

A mixture of 14 parts of 1,4-diamino-5-nitroanthraquinone, 55 parts of nitrobenzene, 30 parts of 1-acetylamino-4-bromobenzene, 30 parts of potassium acetate, 0.3 part of copper (I) chloride and 0.1 part of copper bronze is stirred at 180° until no further 1,4-diamino-5-nitroanthraquinone is present. The acetic acid formed is eliminated by conducting a jet of dry air over the reaction mass. Subsequently the reaction mass is diluted with 320 parts of methyl alcohol and cooled to room temperature. The precipitate is filtered off with suction, washed with methyl alcohol and water and dried.

The 1,4 - bis-(4'-acetylamino-phenylamino)-5-nitroanthraquinone obtained dissolves in hot chlorobenzene with a green coloration.

EXAMPLE 5

A mixture of 14 parts of 1,4-diamino-5-nitroanthraquinone, 120 parts of 1-bromo-4-methoxybenzene, 50 parts of potassium acetate, 0.5 part of copper (I) chloride and 0.1 part of copper bronze is stirred at 180° until no further 1,4-diamino-5-nitroanthraquinone is indicated. The acetic acid formed is eliminated by conducting a weak jet of air over the mass and out of the reaction vessel. The excess 1-bromo-4-methoxybenzene is removed by distillation in water vapor, the water decanted, and the residue recrystallized from n-propyl alcohol. The 1,4-bis-(4'-methoxy-phenylamino)-5-nitroanthraquinione thus obtained dissolves in chlorobenzene to give yellowish green solutions.

EXAMPLE 6

17 parts of a mixture of 1,4-diamino-2,5-dinitroanthraquinone and 1.4-diamino-2,8-dinitroanthraquinone, 150 parts of bromobenzene, 30 parts of potassium acetate, 0.2 part of copper bronze and 0.2 part of copper (I) chloride are stirred at 160°. The acetic acid formed is removed from the reaction vessel by conducting a jet of dry air over the reaction mass. The bromobenzene that evaporates during the process is replaced in portions as required. The reaction mass is stirred until no further starting product is indicated, upon which the bromobenzene is eliminated by distillation with water vapor. The precipitated mixture of 1-amino-2,5-dinitro-4-phenyl-aminoanthraquinone and 1-amino-2,8-dinitro-4-phenyl-aminoanthraquinone is filtered off with suction, washed with water and dried. The dye obtained dissolves in chlorobenzene with a green coloration.

The mixture of 1,4-diamino-2,5-dinitroanthraquinone and 1,4-diamino-2,8-dinitroanthraquinone used as starting material is prepared as follows: 49.1 parts of 1,4-di-(benzoylamino) - 5 - nitroanthraquinone are stirred into 245 parts of nitrobenzene at 90°, after which 65 parts of 70% nitric acid are added dropwise in the course of 3 hours. The mixture is constantly stirred for 20 hours at 93–95°. Subsequently it is allowed to cool to 70° and 400 parts of methanol are added, after which it is cooled further to 10°. The precipitate formed is filtered off with suction, washed with methanol and water and dried.

40 parts of the mixture of 1,4-di-(benzoylamino)-2,5-dinitroanthraquinone and 1,4-di - (benzoylamino)-2,8-dinitroanthraquinone thus obtained are entered into 440 parts of 92% sulfuric acid and the mixture stirred for 3 hours at 90°. It is then run into 2000 parts of water, the precipitate filtered off with suction, washed with water, entered into a solution of 16 parts of sodium carbonate in 2000 parts of water at 90°, stirred for 30 minutes, filtered off with suction, washed with water and dried. The mixture of 1,4-diamino-2,5-dinitroanthraquinone and 1,4-diamino-2,8-dinitroanthraquinone thus obtained melts at 222–225° and dissolves in chlorobenzene with a clear greenish blue coloration.

The following Table 1 contains further dyes of the anthraquinone series obtained according to the details of Examples 1 and 2. They correspond to the formula

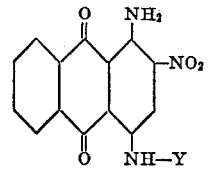

and are characterized by the symbol Y and by the shade of the dyeings on polyester fibers.

TABLE 1

| Example No. | Y | Shade of dyeing on polyester |
|---|---|---|
| 7 | 4-methoxyphenyl | Green. |
| 8 | 2-methoxyphenyl | Do. |
| 9 | 2-methylphenyl | Do. |
| 10 | 3-methylphenyl | Bluish green. |
| 11 | 3-chlorophenyl | Do. |
| 12 | 4-fluorophenyl | Green. |
| 13 | 2,4-dimethylphenyl | Do. |
| 14 | 2,4,6-trimethylphenyl | Blue. |
| 15 | 2,5-dimethylphenyl | Green. |
| 16 | 4-ethylphenyl | Do. |
| 17 | 4-isopropylphenyl | Do. |
| 18 | 4-tert-butylphenyl | Do. |
| 19 | 4-n-butylphenyl | Do. |
| 20 | 4-tert-amylphenyl | Do. |
| 21 | 2,5-dimethoxyphenyl | Do. |
| 22 | 4-propionylaminophenyl | Do. |
| 23 | 4-butyrylaminophenyl | Do. |
| 24 | 4-isovalerianylaminophenyl | Do. |
| 25 | 3-acetylaminophenyl | Bluish green. |
| 26 | 4-chlorophenyl | Green. |
| 27 | 4-ethyl-2-methylphenyl | Do. |
| 28 | 4-ethoxyphenyl | Do. |
| 29 | 3-methoxyphenyl | Do. |

In the following Table 2 are listed further dyes of the anthraquinone series obtained according to the particulars of Examples 3 to 5. They correspond to the formula

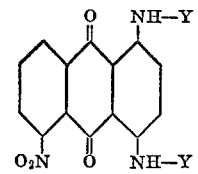

and are characterized by the symbol Y and by the shade of the dyeings on polyester fibers.

TABLE 2

| Example No. | Y | Shade of dyeing on polyester |
|---|---|---|
| 30 | 4-methylphenyl | Green. |
| 31 | 4-ethoxylphenyl | Do. |
| 32 | 4-n-butylphenyl | Do. |
| 33 | 2,5-dimethylphenyl | Do. |
| 34 | 2,4,6-trimethylphenyl | Greenish blue. |
| 35 | 4-chlorophenyl | Green. |
| 36 | 4-propionylaminophenyl | Do. |
| 37 | 3-fluorophenyl | Do. |
| 38 | 4-ethylphenyl | Do. |
| 39 | 2,5-dimethoxyphenyl | Do. |
| 40 | 3-methoxyphenyl | Do. |

Table 3 contains dyes of the anthraquinone series obtained according to Example 6 and corresponding to the formula

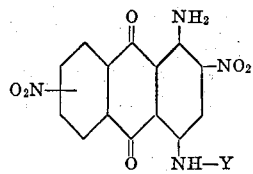

TABLE 3

| Example No. | Y | Shade of dyeing on polyester |
|---|---|---|
| 41 | 4-fluorophenyl | Green. |
| 42 | 4-methylphenyl | Do. |
| 43 | 4-ethylphenyl | Do. |
| 44 | 3-methoxyphenyl | Do. |
| 45 | 4-ethoxyphenyl | Do. |
| 46 | 4-acetylaminophenyl | Do. |

Formulae of representative dyes of the foregoing examples are as follows:

(Example 1)

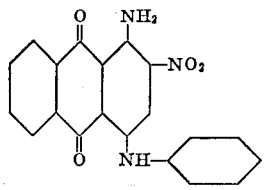

(Example 2)

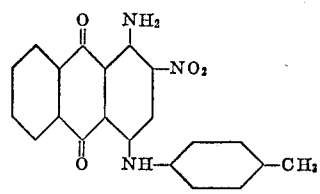

(Example 3)

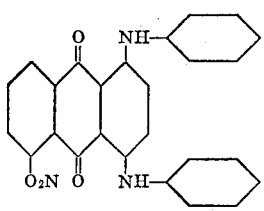

(Example 4)

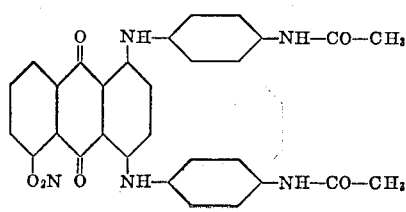

(Example 5)

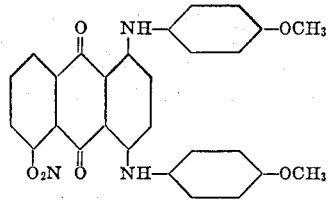

(Example 6)

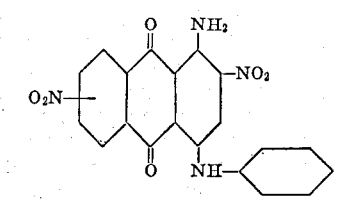

(Example 7)

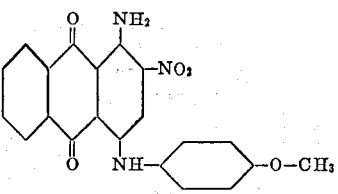

Having thus disclosed the invention what I claim is:

1. Dyes of the anthraquinone series of the formula

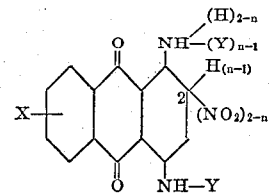

wherein:
 X is a member selected from the group consisting of hydrogen and the nitro group, and stands in one of the positions 5 and 8,
 Y is a member selected from the group consisting of unsubstituted phenyl, phenyl substituted by 1 to 3 lower alkyl groups, phenyl substituted by 1 to 2 lower alkoxy groups, phenyl substituted by 1 halogen atom with an atomic number of at most 17, and phenyl substituted by one lower alkanoylamino group, and
 $n$ is one of the integers 1 and 2,
the dye molecule containing at least one nitro group.

2. Dyes of the anthraquinone series of the formula

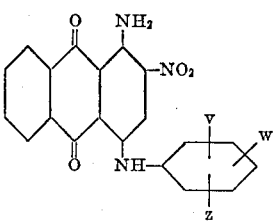

wherein:
 $v$ is a member selected from the group consisting of hydrogen, chlorine, fluorine, lower alkyl, lower alkoxy and lower alkanoylamino,
 $w$ is a member selected from the group consisting of hydrogen, lower alkyl and lower alkoxy, and
 $z$ is a member selected from the group consisting of hydrogen and lower alkyl,
both $w$ and $z$ being hydrogen, when $v$ is a member selected from the group consisting of chlorine, fluorine and lower alkanoylamino.

3. Dyes of the anthraquinone series of the formula

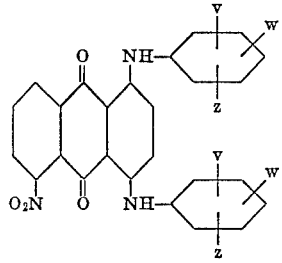

wherein:
v is a member selected from the group consisting of hydrogen, chlorine, fluorine, lower alkyl, lower alkoxy and lower alkanoylamino,
w is a member selected from the group consisting of hydrogen, lower alkyl and lower alkoxy, and
z is a member selected from the group consisting of hydrogen and lower alkyl,
both w and z being hydrogen, when v is a member selected from the group consisting of chlorine, fluorine and lower alkanoyl amino.

4. The dye of the formula

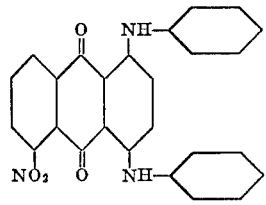

5. The dye of the formula

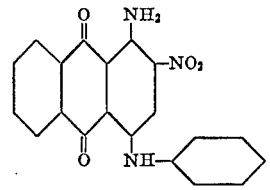

6. The dye of the formula

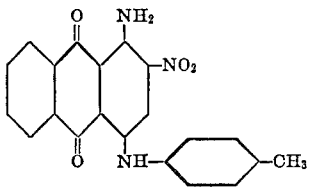

7. The dye of the formula

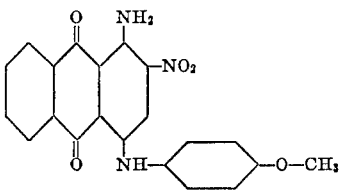

8. The dye of the formula

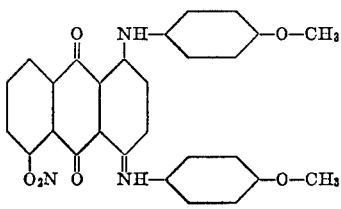

9. The dye of the formula

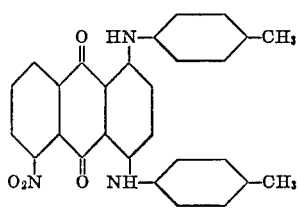

References Cited

UNITED STATES PATENTS

| | | | |
|---|---|---|---|
| 2,640,059 | 5/1953 | Salvin et al. | 260—380 XR |
| 2,727,045 | 12/1955 | McSheehy | 260—378 |
| 3,147,287 | 9/1964 | Boyd et al. | 260—373 |
| 3,205,241 | 9/1965 | Eaton et al. | 260—378 |
| 3,265,460 | 8/1966 | Hoare. | |
| 2,258,551 | 10/1941 | Grossmann | 260—378 |
| 2,894,800 | 7/1959 | Guenthard et al. | 260—377 XR |

FOREIGN PATENTS 628,512    5/1963    Belgium.

OTHER REFERENCES

Houben: Das Anthracen und die Anthrachinone Leipzig: George Thieme Verlay (1952), pp. 480–485.
Beilstein: Handbuch Org. Chem., vol. 14, Hptwke., p. 203 (1931).

LORRAINE A. WEINBERGER, *Primary Examiner.*
H. C. WEGNER, *Assistant Examiner.*

U.S. Cl. X.R.

8—39, 40; 260—377, 381

UNITED STATES PATENT OFFICE
CERTIFICATE OF CORRECTION

Patent No. 3,444,214                                    May 13, 1969

Paul Buecheler

It is certified that error appears in the above identified patent and that said Letters Patent are hereby corrected as shown below:

Column 1, line 50, "atoms" should read -- atoms, --.
Column 3, line 31, "tions," should read -- tions of reactions, --; line 72, "(hydroxymethyl" should read -- (hydroxymethyl) --. Column 4, line 32, "matural" should read -- natural --.
Column 10, claim 8, the lower half of the formula should appear as shown below:

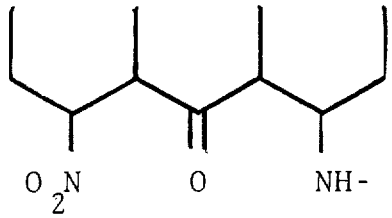

Claim 9, in the lower portion of the formula "NH" should read

-- HN| --.

Signed and sealed this 28th day of April 1970.

(SEAL)
Attest:

EDWARD M. FLETCHER, JR.                          WILLIAM E. SCHUYLER, JR.
Attesting Officer                                  Commissioner of Patents